3,011,988
ACRYLIC TETRAPOLYMER, AQUEOUS DISPERSION THEREOF AND ARTICLE COATED THEREWITH

Walter E. Luedke, deceased, late of St. Paul, Minn., by Helen L. Luedke, administratrix, St. Paul, Minn., and Carl A. Dahlquist, St. Paul, and James O. Hendricks, White Bear Lake, Minn., assignors to Minnesota Mining and Manufacturing Company, St. Paul, Minn., a corporation of Delaware
No Drawing. Filed May 21, 1957, Ser. No. 660,443
8 Claims. (Cl. 260—29.6)

The present invention relates to new and useful protective and decorative coatings and more particularly relates to novel polymers of certain combinations of acrylic monomers, e.g., monomers of acrylic acid and methacrylic acid, their esters, nitriles, and the like, and to the novel coating compositions, and coatings of these polymers.

To a limited extent heretofore acrylic polymers such as polymethyl methacrylate, polyethylacrylate, polybutyl methacrylate and the like have been used in the formulation of coating compositions. However, because of poor leveling characteristics, poor surface adhesion, low abrasion resistance, rapid dirt pickup, and other shortcomings these heretofore known acrylic polymers have not achieved widespread use as transparent protective surface coatings for exterior uses and except for a few specialized coating applications, are most often used in the formulation of opaque pigmented interior wall finishes and the like. Such use sacrifices the outstanding transparency and remarkable light-stability possessed by most acrylic polymers, characteristics strived for in waxes, lacquers and varnishes.

It is an object of this invention to provide polymers of certain combinations of acrylic monomers which form coatings which are not only free from the shortcomings of previously known acrylic polymers but which provide an unexpected and valuable combination of useful coating properties. These polymers level well and provide tough and durable protective and decorative coatings which combine the surface feel, appearance and buffability normally associated with waxes with non-chalking, self sealing, abrasion resistant, water and solvent resistant and color-fast properties highly desirable but heretofore only incompletely available in varnishes or lacquers. Another object is to provide liquid coating compositions of these polymers which are capable of general application by brush, roller, spray gun, or soft cloth and the like to wood, metal and plastic surfaces. A further object is to provide acrylic polymers as protective and decorative coatings for wood which serve as their own sealers and which emphasize wood grain without wood discoloration. These and other objects which will become apparent as the description proceeds are attained by the polymers of this invention.

By the term "an acrylic acid" as used hereinafter is meant acrylic acid or methacrylic acid. Where the compound is to be specifically understood to be acrylic acid or methacrylic acid, the prefix "an" will be absent. Where the compound is to be specifically understood to be an ester or nitrile of acrylic acid or methacrylic acid, the terms "acrylate" and "acrylonitrile" and "methacrylate" and "methacrylonitrile" will be used respectively to denote this fact.

Each of the polymers of this invention comprises the copolymerization product of, in percent by weight, (1) from about 25 to about 65% of an acrylic acid ester of a long chain alkyl terminated primary alcohol wherein the terminal alkyl chain is from at least about 12 to about 24 carbon atoms in length, (2) about 3 to about 15% of an acrylic acid, (3) about 10 to about 35% of an acrylic acid nitrile, and, (4) 0 to about 40% of a compound selected from the group consisting of an acrylic acid ester of methyl, ethyl and cyclohexyl aclohol. Preferable polymer coatings are those tetrapolymers where (4) is included in amounts of about 10% and above.

Coatings of these polymers level well and provide smooth continuous films which have the surface appearance and feel of a wax; that is, the appearance of a soft, lustrous gloss with the smooth, soft, feel of a waxy surface to the touch. These coatings are readily buffed and require no buffing compound in their buffing. They are also extremely durable, being water and hydrocarbon solvent resistant, scratch and crack resistant, non-chalking, non-yellowing and self sealing. This unusual combination of properties is unique to the polymers of this invention and enables clear coatings thereof to simultaneously serve as waxes, lacquers and varnishes.

Varying the amounts of the individual monomers beyond the ranges specified in the preceding paragraph results in polymers deficient in one or more valuable properties to a degree which seriously detracts from their utility as protective and decorative coatings. For example, if the amount of (1), the long chain alkyl terminated acrylate or methacrylate, is reduced below about 25% in the preparation of the polymer, the resulting coating is devoid of a "wax-like" feel or appearance and has a hard, high gloss surface only difficulty buffable, if at all. A polymer made from a monomeric mixture containing more than about 65% of (1) on the other hand forms a coating too weak and brittle for most applications, possessing little scratch resistance and being easily flaked off. By copolymerizing the monomers within the percentage ranges specified, polymers having a unique combination of properties valuable to coatings, both in enabling their application to surfaces and maintaining their protective and decorative functions on such surfaces, are obtained.

These polymer coatings may be "tailored" to emphasize certain properties and de-emphasize others by varying, within the ranges previously specified, the weight percentages of the monomers relative to one another. By proper proportioning of the formulating monomers, the polymers may be "tailored" in accordance with the disclosure herein provided as wood finishes, floor coatings, chrome coatings, automobile enamel protective coatings and the like wherein the value of the coatings is predicated on the emphasis of specific properties.

Some of the characteristics of the long chain alkyl terminated acrylate (or equivalent methacrylate), have been previously mentioned. In addition, this ester provides excellent water resistance to the coating. However, when used in amounts greater than about 65% by weight in the polymer formulation, the resulting polymer is difficult to disperse in water and forms weak, brittle, easily scratched coatings. When used in amounts less than about 25% in the polymer formulation, high gloss coatings lacking a waxy feel and appearance and having insufficient water resistance result. The terminal alkyl substituent requires a chain length of at least about 12 carbon atoms, or its equivalent, in order to impart a waxy feel and appearance to the polymer coating. Preferred long chain alkyl terminated acrylates and methacrylates are those derived from long chain aliphatic alcohols and alk-aryloxy-alkanols having alkyl substituents containing from about 16 to about 22 carbon atoms. While longer chains alkyl substituents are also useful, acrylates possessing alkyl chain lengths of more than 24 carbon atoms are difficult to prepare and, consequently, are less desirable.

The presence of an acrylic acid in the polymer is necessary to assure good surface adhesion of the polymer to a surface when coated thereon. In addition, this ingredient contributes to the toughness and hardness of the coating.

Too much acid, that is, over about 15% by weight makes the resulting polymer too water sensitive causing the coating to spot or discolor under the action of water. Too little acid, that is, amounts less than about 3%, results in a polymer having poor adhesion to common surfaces, such as wood and metal. As will appear hereinafter, if the polymer is to be applied from a water dispersion, the amount of acrylic or methacrylic acid must be at least about 5%.

To provide the polymer with resistance to hydrocarbon solvents, and to promote extensibility as well as hardness and toughness in the coatings, acrylonitrile or methacrylonitrile must be present in the preparation of the polymer in an amount at least about 10%. However, since this ingredient tends to impart a tan color to the polymer and when used in excessive amounts reduces conversion yield from monomer to polymer, it should not be used in amounts above about 35%.

The methyl, ethyl, or cyclohexyl acrylate (or methacrylate), in amounts up to about 40% by weight of the monomeric mixture, may replace in part either the long chain acrylate (or methacrylate) or the nitrile or both without seriously detracting from the valuable properties of the multipolymers as coatings. In fact, the utilization of one of these lower alkyl acrylates as a replacement for a portion of one or both of the aforementioned ingredients is often beneficial and the preferred polymers are those containing at least about 10% of one of these lower alkylacrylates; they tend to toughen and harden the polymer coating when used as replacements of a portion of the long chain alkyl or alkaryl acrylate, and to increase the polymer yield and inhibit undue coloring of the polymer when used as a replacement for a portion of the acrylonitrile or methacrylonitrile.

For the most part, these polymers may be provided as easily applied liquid coating compositions in the form of aqueous dispersions or organic solutions. Aqueous dispersions containing solids concentrations of polymer of more than about 20% by weight are generally too viscous to coat. Although extremely dilute dispersions wherein the solids content is less than about 5% by weight coat easily, the resulting polymers coating is too thin for most purposes. Preferable dispersions are those containing from about 5 to about 15% by weight polymer solids; these compositions are easily applied by conventional means such as by brush, cloth, roller, or spray gun and dry quickly to usefully durable protective and decorative coatings from a single application. Organic dispersions and solutions on the other hand may contain up to about 50%, and more, polymer solids and still be applied by conventional means.

When the polymer is to be applied from an aqueous dispersion, it is converted to a water soluble derivative thereof, such as its ammonia or morpholine derivative. A convenient method for providing a coating composition composed of a water dispersion of the polymer is to add water and morpholine to a tertiary butanol solution of the polymer and then remove the tertiary butanol by distillation." The polymer remains as the morpholine derivative dispersed in water, reverting to its original state as the coating dries on a surface.

Providing the coating compositions as water dispersions, methacrylic acid in their formulation are too water insensitive to disperse in water even as morpholine derivatives. However, all those polymers containing about 5% or more acid in their formulation may be dispersed in water in the manner noted in the preceding paragraph.

Providing the coating compositions as water dispersions, besides being economical, eliminates many problems ordinarily associated with organic solutions and dispersions such as adverse effects of the organic solvent or carrier on the surface to be coated, fire and health hazards, solvent toxicity and odor, etc.

While most of the polymers of this invention may be applied as coatings from water dispersions thereof, the coatings are quite water resistant and do not spot or discolor when subjected to water for long periods of time— interior furniture coatings thereof having resisted water discoloration from the bottoms of wet drinking glasses placed and allowed to dry thereon without wiping, a relatively severe test.

All of the polymers of this invention may be supplied as organic solutions thereof by dissolving the polymer in an appropriate organic solvent. Tertiary-butanol and similar alcohols, xylene, ethyl acetate, butyl acetate, amyl acetate and methyl-ethyl ketone have all been found to be appropriate solvents.

These liquid coating compositions vary in consistency as the solids content rises toward about 20% in the case of water dispersions, and toward about 50% in organic solvents such as ethyl acetate, from free flowing to relatively viscous liquids. They are generally transparent, and vary from a straw-like color to amber. In water dispersions of low acrylic acid content (about 5%) polymers, the compositions may have a milky-white appearance before application. If it is desired, the polymers may be pigmented to provide opaque rather than clear coatings by blending in pigments such as bentonite, clay, mica, titanium dioxide, etc.

The liquid coating compositions level well and dry quickly to smooth surfaced polymer coatings which may be buffed or sanded in as little as 30 minutes after their application to a surface. A second coating may be applied over an incompletely dried first coating, without danger of gumming. These coatings sand more easily than either waxes or varnishes and require no buffing compound in their buffing. Since they are self-sealing, they may be applied to wood surfaces without the necessity of first applying a separate wood sealer.

Procedures for the formulation of these polymers and liquid coating compositions thereof, are set forth in the following illustrative examples.

*Example 1*

(A)

A tetrapolymer was made from a monomeric mixture in percent by weight of

| | |
|---|---|
| Octadecyl acrylate | 51 |
| Acrylic acid | 9 |
| Acrylonitrile | 29 |
| Methyl acrylate | 11 | as follows:

One hundred and two pounds of 50% octadecyl acrylate in tertiary butanol, 29 pounds of distilled acrylonitrile, 11 pounds of distilled methyl acrylate, 10.5 pounds of 85% acrylic acid and sufficient additional tertiary butanol to bring the total amount present up to 125 pounds were charged to a clean, dry 75 gallon glass-lined reaction vessel which was equipped with an agitator, temperature controls, a stainless steel reflux condenser, a sampling line and a fitted opening for adding liquids and gases. The vessel was sealed and flushed four times with nitrogen to remove the air (the internal pressure being raised each time to 30 pounds per square inch, gage, with the nitrogen and then being slowly released). The mixture was next heated to reflux (185° F.) with agitation during which time nitrogen was passed slowly through the vapor. After 15 minutes at reflux, the mixture was cooled to 170° F. and one pound of benzoyl peroxide in 8 pounds of tertiary butanol was added under a nitrogen flush. The vessel was reclosed and held at 1–2 p.s.i.g., with nitrogen. After 7 hours the resulting solution of the polymer in tertiary butanol was cooled to 100° F. and drained from the vessel. A conversion of 85% monomer to polymer was realized.

(B)

A water dispersion containing about 12% by weight polymer solids was prepared from the solution of (A) as follows:

Two hundred and thirty nine pounds of this solution was charged to a 200 gallon glass-lined jacketed vessel equipped with an agitator, temperature controls, a stainless steel open column, an inclined condenser and a condensate receiver and heated to 60° C. A solution of 15.8 pounds morpholine and 43.5 pounds of water were added with rapid stirring. After 10 minutes 694 pounds of additional water (preheated to 60° C.) was added rapidly and with vigorous agitation. The solvent was removed by distillation at 60° C. under reduced pressure leaving a liquid coating composition comprising the water dispersion of the polymer.

(C)

The liquid coating composition of B was coated on various surfaces to evaluate the resulting tetrapolymer coating. In one series of tests, duplicate panels of birch, pine, fir, redwood, oak, walnut, ash, elm, basswood, samara, gumwood, cedar and mahogany were coated with a commercial nitrocellulose lacquer wood finish and with the tetrapolymer. The lacquer coating darkened on aging and was relatively hard. The tetrapolymer coating developed the wood grain without discoloring it and did not darken on aging. It was softer than the lacquer (actually intermediate between lacquers and varnishes in hardness as measured on Tukon Knoop and Sward hardness testers, both of which are well-known in the coatings field) and exhibited the characteristic waxy feel and appearance indigenous to coating compositions of this invention. When the panels were washed with a commercial trisodium phosphate-base cleaner, the lacquer was completely removed while the tetrapolymer remained unaffected.

A second series of tests of the same tetrapolymer on wood was designed primarily to compare its ease of handling with the ease of handling conventional nitrocellular lacquer and drying oil varnish. Both the polymer and varnish sprayed, brushed and roll coated without difficulty (it was also found to be possible to apply the polymer easily with a clean, dry cloth). The lacquer sprayed well but was difficult to apply from a brush or roll. The polymer dried dust-free (i.e. sufficiently so that it would not pick up dust) in 14 minutes and could be buffed, sanded, recoated, etc. 30 minutes after being applied. The same relative times were 10 minutes and 4 hours for the lacquer and 4 hours and 48 hours for the varnish. The coatings were then sanded with fine grit sand paper. The sanding or leveling time for the polymer was about half that for lacquer and three quarters that for varnish.

The polymer dry buffed to a smooth satin-lustrous finish. The lacquer and varnish both required the use of a buffing compound and each buffed to a hard gloss. The buffing time was about the same for all three, but no cleanup of the buffing compound was required in the case of the polymer. The polymer-coated panels were not discolored (when compared to the uncoated wood), the lacquered panels were slightly discolored and the varnished panels were considerably discolored.

This polymer was tested as a coating for exterior building materials. When coated on asbestos shingles and aged along with untreated and commercial-silicone-treated shingles on outside 45° south-facing racks for one month, the tetrapolymer-coated shingles remained smooth and lustrous without any evidence of chalking. The uncoated and silicone-coated shingles, on the other hand, were already chalky. When again observed after seven months' aging, the tetrapolymer-coated shingles were unchanged.

In still another series of tests the tetropolymer was evaluated as a coating on exterior cedar shakes which had been coated previously with a chalking alkyd resin. This application requires a finish that transmits water vapor so that moisture penetrating from the back can escape easily rather than being trapped and causing cracking and peeling. Tetrapolymer-coated shakes, along with others which were coated only with the chalking alkyd (this being the standard commercial treatment), were placed on the exterior southern face of a house, on an outside 45° south-facing rack and in a Weatherometer. The latter test environment consisted of the repeated cycle of water spraying and sand blasting followed by drying by carbon arc. After five months on the house and rack the tetrapolymer coated shakes had chalked less and retained their luster better than the commercial shakes and neither those in the Weatherometer nor those on the rack had cracked or peeled. The same comparative results were obtained from the Weatherometer-aged shakes after 820 hours (which is the equivalent of more than three years' outdoor aging).

In another series of tests, the coating composition was applied to a portion of the enamel finish of an automobile. Other portions of the automobile finish were coated with conventional automobile finish protective coatings: namely, a paste wax, a non-wetting liquid wax, wetting liquid wax, polymer and wax compositions, silicone, methyl-cellulose containing polish, and a carboxy methylcellulose containing coating.

The automobile was subjected to exposure to the elements during normal driving for a period of three months. Upon washing the finish of the automobile at the end of this period, only the portion of the finish protected by the tetrapolymer coating remained free from oxidation and the coating remained unchanged in appearance from the time of its application; the other coatings had all failed. After eight months, this tetrapolymer coating was still performing excellently and appeared to be unchanged from the time of its application.

This coating composition was also coated on a portion of the chrome plating of an automobile, and another portion of the chrome plating was treated with a commercially sold styrenated alkyd resin. Upon examination at the end of three months, the tetrapolymer coating had not degraded in any way and moreover was easily removable from the chrome by washing with an appropriate solvent such as methyl-ethyl ketone. The styrenated alkyd resin on the other hand had already discolored and had begun to crack and peel; it could not be removed by solvents.

The tetrapolymer of this example contained a relatively high percentage of higher alkyl acrylate and while being among the softer coatings within the scope of the invention is nevertheless quite durable and abrasion resistant. Polymers providing harder coatings are set forth in subsequent examples.

*Example 2*

Tetrapolymers were prepared from the monomeric mixtures listed below.

(1)

| | Parts |
|---|---|
| Octadecyl acrylate | 51 |
| Acrylonitrile | 29 |
| Acrylic acid | 8½ |
| Ethyl acrylate | 11½ |

(2)

| | |
|---|---|
| Lauryl acrylate | 51 |
| Acrylonitrile | 29 |
| Acrylic acid | 9 |
| Cyclohexyl acrylate | 11 |

(3)

| | |
|---|---|
| Lauryl methacrylate | 51 |
| Acrylonitrile | 29 |
| Acrylic acid | 9 |
| Cyclohexyl acrylate | 11 |

The preparation of all three polymers was substantially identical and is illustrated by the detailed procedure relative to (1) as follows:

A 500 ml. 3-necked flask was fitted with a stirrer, a reflux condenser, and a thermometer and was set up in a water bath. The following were charged to the flask:

| | Grams |
|---|---|
| Octadecyl acrylate | 54 |
| Acrylonitrile (commercial, flash distilled) | 30 |
| Ethyl acrylate (flash distilled) | 12 |
| Acrylic acid | 9 |
| Ethyl acetate (flash distilled 73–75° C.) | 195 |
| Benzoyl peroxide | 1.05 |

The mixture was reacted with agitation for 18 hrs. at a temperature of 60–75° C. A straw-colored syrupy resin solution was obtained (31.6% solids by weight).

One hundred cc. of isopropanol was added to a flask containing 100 grams of this solution; 3.6 grams of morpholine was added and the polymer precipitated in a gummy mass. 400 grams of water was then added and the polymer went into solution. The solution was warmed on a steam bath to drive off the organic solvents and leave the polymer in an aqueous dispersion. During this time the pH was maintained between 6.5 and 7.0 by the addition of small quantities of morpholine (a total of 2.8 grams of morpholine was added during the boiling off period). When the temperature reached 90° C. heating was discontinued. The final weight of the dispersion was adjusted to 393 grams (8.4% solids, pH 7.1, surface tension 49 dynes/cm., appearance; semi-transparent). Morpholine oleate was added as a levelling agent to the dispersion in the amount of 10% of the weight of the tetrapolymer solids.

Polymers (2) and (3) were prepared by approximately the same process.

These three polymers are closely similar to each other and to the polymer of Example 1. Numbers (2) and (3) were coated on wooden panels and were found to differ from that of Example 1 only in that they formed slightly softer films. Number (1) was nearly identical to the polymer of Example 1. It was evaluated as a floor coating by coating on white linoleum test panels and being allowed to dry for 3 hours; the coated panel was then placed on a heavily traveled floor area along with control panels coated with a commercial floor wax. After a 48-hour test, the panels were examined for dirt pick-up. The tetrapolymer-coated panels were found to be considerably cleaner (less dirt pick-up) than the control panels. In further tests this tetrapolymer dispersion was found to be superior to industrial emulsion wax finishes in durability, non-slip characteristics and ease of cleaning.

*Example 3*

A terpolymer was prepared from a monomeric mixture of:

| | Percent |
|---|---|
| Octadecyl acrylate | 57 |
| Acrylonitrile | 34 |
| Acrylic acid | 9 | as follows:

Twenty grams of octadecyl acrylate, 12 grams of acrylonitrile, and 3 grams of acrylic acid were added to a flask containing 65 grams of ethyl acetate. 0.35 gram of benzoyl peroxide was added and the reaction mixture was heated to 77° C. for 5½ hrs. An amber colored resin solution was obtained (30.6% solids).

Ten grams of this solution was poured into a flask containing 100 cc. of methanol, the polymer precipitated immediately and was filtered off. The polymer was redissolved in a mixture of 10 grams each of isopropyl alcohol and acetone. Ten cc. of water and 1 cc. of 28% aqueous ammonium hydroxide were added. The solution was heated and the organic solvents were replaced by water as they boiled off. A cloudy, straw colored dispersion resulted which was cut with water to 7½% solids. The dispersion forms clear, smooth coatings when brushed or sprayed on various surfaces such as linoleum, wood, chrome and painted metal surfaces.

*Example 4*

A number of polymers containing relatively low percentages of long-chain acrylates and relatively high percentages of short-chain acrylates have been made and evaluated. The following monomeric mixtures are representative ones from which tetrapolymers useful as coating compositions have been prepared (the figures represent percent by weight).

(1)

| | |
|---|---|
| Octadecyl acrylate | 25 |
| Acrylonitrile | 32 |
| Acrylic acid | 10 |
| Cyclohexyl acrylate | 33 |

(2)

| | |
|---|---|
| Octadecyl acrylate | 30 |
| Acrylonitrile | 30 |
| Acrylic acid | 10 |
| Cyclohexyl acrylate | 30 |

(3)

| | |
|---|---|
| Octadecyl acrylate | 35 |
| Acrylonitrile | 32 |
| Acrylic acid | 10 |
| Cyclohexyl acrylate | 23 |

(4)

| | |
|---|---|
| Octadecyl acrylate | 30 |
| Acrylonitrile | 30 |
| Acrylic acid | 10 |
| Ethyl acrylate | 30 |

Since the polymer preparation is about the same for each monomeric mixture, the procedure described with reference to (1) described below is typical of all.

A split 1-liter resin flask with 3 necks and a thermometer well was used for this preparation. The flask was fitted with a thermometer, a reflux column, an agitator and a tube for providing a nitrogen blanket over the reaction mixture. The following were charged to the flask:

| | Parts |
|---|---|
| Octadecyl acrylate | 25 |
| Acrylonitrile | 32 |
| Acrylic acid | 10 |
| Cyclohexyl acrylate | 33 |
| t-Butanol | 185 |
| Benzoyl peroxide | 0.5 |

The mixture was reacted at 73–75° C. in a nitrogen atmosphere for 3 hours at which time 0.25 part of benzoyl peroxide was added. The mixture was then reacted for an additional 16 hours and another 0.15 part of benzoyl peroxide was added. After 3 more hours heating was discontinued. The resulting solution contained 32% by weight of tetrapolymer (corresponding to a conversion of roughly 91%).

Polymers (2), (3) and (4) were prepared by approximately the same process. In all cases quantitative, or nearly quantitative, yields were recovered.

The properties of these four polymers are quite similar. They were diluted with xylene, lacquer thinner, retarder solvent and naphthol spirits down to concentrations from about 5 to about 15% solids to permit their application as coatings. While retaining the general characteristics of all coatings of the invention (notably the waxy feel and appearance) these are harder, and somewhat more glossy and less wax-like surface characteristics than compositions containing more long-chain acrylate and less short-chain acrylate. The substitution of ethyl acrylate for cyclohexyl acrylate in (4) effected very little change but appeared to render the coatings very slightly harder and more brittle.

Films of ploymer (1) were coated from the solvents mentioned above on wood. They were found to be hard and difficult to scratch, but still sanded and buffed easily. Very smooth wax-like finishes were obtained by sanding and buffing.

Solutions of polymer (2) in the various solvents mentioned above were applied to wood panels. The resulting clear, colorless coatings possessed the characteristic wax-like feel and appearance of the coatings of this invention. They were tough and continuous and sanded and buffed easily.

The series of tests described in Example 1 relative to comparing the ease of handling of the polymer with that of lacquer and varnish (when coated on wood) were also run with this polymer. The results were comparable to those obtained with the polymer of Example 1 except that this polymer dried dust free in 23 minutes (instead of 14) and to workability in 45 minutes (instead of 30).

Polymers (3) and (4) were also coated onto surfaces from the various solvents noted and were found to form coatings similar to coatings of polymers (1) and (2) of this example in sandability, buffability and appearance.

*Example 5*

The three polymers of the monomer combinations set forth below disclosed the effects of varying the relative amount of acrylonitrile in the monomeric mixtures; figures represent percent by weight.

(1)

| | |
|---|---|
| Octadecyl acrylate | 45 |
| Acrylonitrile | 10 |
| Cyclohexyl acrylate | 40 |
| Acrylic acid | 5 |

(2)

| | |
|---|---|
| Octadecyl acrylate | 40 |
| Acrylonitrile | 20 |
| Cyclohexyl acrylate | 35 |
| Acrylic acid | 5 |

(3)

| | |
|---|---|
| Octadecyl acrylate | 40 |
| Acrylonitrile | 25 |
| Cyclohexyl acrylate | 30 |
| Acrylic acid | 5 |

The polymers were solution polymerized according to the procedure of the previous experiment. Polymer (1) was polymerized in xylene solution, polymer (2) was polymerized in separate portions in both tertiary butanol and in xylene, and polymer (3) was polymerized in separate portions in both tertiary butanol and in mineral spirits. All were cut to about 7½ to 15% solids for ease of coating. The solvents in which polymerization was carried out and from which the polymers were coated seemed to have little or no effect on the properties of the final coatings. In addition all three polymers dissolved easily in lacquer thinner, naphthol spirits, retarder solvent and xylene and they all coated easily from these organic solvents to clear, smooth, wax-like coatings on wood panels with no discoloration of the wood grain. The film of polymer (1) was too weak and brittle to sand or buff and is not, therefore recommended for top coats. It is, however, admirable as a clear, nondiscoloring sealer or undercoat for use with another top coat. Polymer (2) sanded and buffed with some difficulty to a coating which, although not as strong and tough as polymers of the invention which contain relatively more acrylonitrile, is suitable for use in protective and decorative coating applications in which extreme strength and toughness are not required as well as in clear sealers or undercoats. Polymer (3) formed a strong, tough, colorless, wax-like appearing coating which was sandable and buffable and was in fact quite similar to the films of the polymers covered in Example 4.

Examples of other monomeric combinations which have been copolymerized to produce useful coatings following the general procedures set forth in the specific examples are given below. Here again, the figures represent percent by weight.

| | |
|---|---|
| Octadecyl acrylate | 25 |
| Acrylic acid | 10 |
| Acrylonitrile | 32 |
| Cyclohexyl acrylate | 23 |

| | |
|---|---|
| Octadecyl acrylate | 51 |
| Acrylic acid | 9 |
| Acrylonitrile | 29 |
| Methyl methacrylate | 11 |

| | |
|---|---|
| 3-pentadecylphenoxethyl acrylate | 50 |
| Acrylic acid | 5 |
| Acrylonitrile | 30 |
| Cyclohexyl acrylate | 15 |

While numerous other usable monomeric combinations have been used, those specifically set forth hereinbefore are believed representative of all. Tetrapolymers containing at least about 10% of methyl, ethyl, or cyclohexyl acrylate or methacrylate are preferred over polymers from which this ingredient is absent or in smaller amounts. The presence of this monomer provides coatings which appear to have a better balance of desirable properties.

The polymers which appear to have the best balance of valuable properties for general coatings applications are those comprising the copolymerization products of the following monomers combined in the percent by weight ranges noted.

| | |
|---|---|
| Long chain alkyl acrylate | 30–50 |
| Acrylic acid | 5–10 |
| Acrylonitrile | 25–35 |
| Methyl, ethyl or cyclohexyl acrylate | 15–35 |

Uniformly good coatings which may be coated from either organic solvents or water dispersions result from monomer combinations within the ranges specified above.

Outstandingly good soft gloss and high gloss coatings are produced respectively by 50:5:30:15 and 30:5:30:35 octadecyl acrylate, acrylic acid, acrylonitrile, cyclohexylacrylate combinations. The polymer of the 30:5:30:35 mixture has been dissolved in ethyl acetate to provide usable liquid coating compositions containing in the order of 50% solids, which compositions may be applied to surfaces by conventional means such as brushing and the like.

What is claimed as new is as follows:

1. A protective and decorative composition composed of a polymer capable of forming a tough, durable, scratch and solvent resistant self-sealing, non-chalking surface protective and decorative coating, said polymer comprising the copolymerization product in percent by weight of, (1) from about 25 to about 65% of an ester of a long chain alkyl terminated primary alcohol wherein the terminal alkyl chain is from at least 12 to about 22 carbon atoms in length, and an acid selected from the group consisting of acrylic and methacrylic acids (2) about 3 to about 15% of an acrylic acid selected from the group consisting of acrylic and methacrylic acids, (3), about 10 to about 35% of a nitrile of an acid selected from the group consisting of acrylic and methacrylic acids, and (4) from about 10 to about 40% of a compound selected from the group consisting of methyl, ethyl and cyclohexyl acrylate.

2. A protective and decorative composition composed of a polymer capable of forming a tough, durable, buffable, non-chalking, scratch and solvent resistant surface protective and decorative coating, said polymer comprising the copolymerization product in percent by weight of (1) about 30 to about 50% of a long chain alkyl acrylate wherein the alkyl chain is at least about 12 to about 22 carbon atoms in length, (2) about 5–10% acrylic acid, (3) about 25–35% acrylonitrile, and (4) about 15–35% of a compound selected from the group consisting of methyl, ethyl and cyclohexyl acrylate.

3. An article having a normally solid surface coated with a tough, durable, scratch and solvent resistant, self-sealing, non-chalking, surface protective and decorative coating of the composition of claim 1.

4. An article having a normally solid surface coated with a tough, durable, scratch and solvent resistant, self-sealing, non-chalking, surface protective and decorative coating of the composition of claim 2.

5. A liquid coating composition comprising up to about 50% by weight solids of the polymer of claim 1 in an organic liquid vehicle.

6. A liquid coating composition comprising up to about 50% by weight solids of the polymer of claim 2 in an organic liquid vehicle.

7. A liquid coating composition comprising an aqueous dispersion containing up to about 20% by weight solids of the polymer of claim 1.

8. A liquid coating composition comprising an aqueous dispersion containing up to about 20% by weight solids of the polymer of claim 2.

References Cited in the file of this patent

UNITED STATES PATENTS

| | | |
|---|---|---|
| 2,649,439 | Brown | Aug. 18, 1953 |
| 2,753,318 | Maeder | July 3, 1956 |
| 2,765,229 | McLaughlin | Oct. 2, 1956 |
| 2,795,564 | Conn | June 11, 1957 |

FOREIGN PATENTS

| | | |
|---|---|---|
| 1,053,510 | France | Sept. 30, 1953 |

UNITED STATES PATENT OFFICE
CERTIFICATE OF CORRECTION

Patent No. 3,011,988                                   December 5, 1961

Walter E. Luedke, deceased, by Hellen L. Luedke, administratrix, et al.

It is hereby certified that error appears in the above numbered patent requiring correction and that the said Letters Patent should read as corrected below.

Column 3, line 62, for "Providing the coating composition as water dispersions," read -- Polymers containing less than about 5% acrylic or --; column 6, line 10, for "followed" read -- followed --.

Signed and sealed this 12th day of June 1962.

(SEAL)
Attest:

ERNEST W. SWIDER                                  DAVID L. LADD
Attesting Officer                                      Commissioner of Patents